United States Patent [19]

Bromley

[11] 4,185,825
[45] Jan. 29, 1980

[54] TELEVISION TARGET GAME AND METHOD

[75] Inventor: Eric Bromley, West Simsbury, Conn.

[73] Assignee: Coleco Industries, Inc., Hartford, Conn.

[21] Appl. No.: 822,151

[22] Filed: Aug. 8, 1977

[51] Int. Cl.² .......................... F41F 27/00; F41J 9/00
[52] U.S. Cl. ........................ 273/101.2; 273/DIG. 28
[58] Field of Search .............. 35/25; 273/101.1, 101.2, 273/102.2 R, 102.2 B, 85 G, DIG. 28; 250/200, 549; 340/324 AD

[56] References Cited

U.S. PATENT DOCUMENTS

| | | | |
|---|---|---|---|
| 3,170,689 | 2/1965 | Brown et al. | 273/50 |
| 3,271,032 | 9/1966 | Rabinowitz et al. | 273/101.1 |
| 3,549,147 | 12/1970 | Katter | 273/101.1 |
| 3,599,221 | 8/1971 | Baer | 273/101.1 X |
| 3,728,480 | 4/1973 | Baer | 273/101.2 X |
| 3,811,204 | 5/1974 | Marshall et al. | 273/101.1 X |
| 3,838,856 | 10/1974 | Takeya et al. | 273/101.1 |
| 3,888,022 | 6/1975 | Pardes et al. | 35/25 |

OTHER PUBLICATIONS

*Elektor;* "Score on Screen for TV Games;" Oct., 1976; pp. 1008-1012.
*Gametronics Proceedings;* vol. 1; Jan. 1977; pp. 185-187, 189, 191-193, 195, 196.

*Primary Examiner*—Vance Y. Hum

[57] ABSTRACT

A target game to be utilized in conjunction with a television receiver includes a simulated firearm with light sensing device, sighting elements and a trigger mechanism so that a signal will be generated by the light sensing device when the firearm is aligned with a light image. In addition, there is provided a control assembly which includes a hit evaluating circuit. The signal generated in the light sensing device is coextensive in duration with the duration of the sensed light image, and the hit evaluating circuit includes a time comparing circuit for comparing the duration of the signal from the sensed light image with a predetermined interval. When the sensed light image signal duration is within the predetermined interval, a hit signal is generated. Desirably, the light sensing device includes an optical lens system for focusing light rays from the target image onto a photosensitive transistor.

26 Claims, 9 Drawing Figures

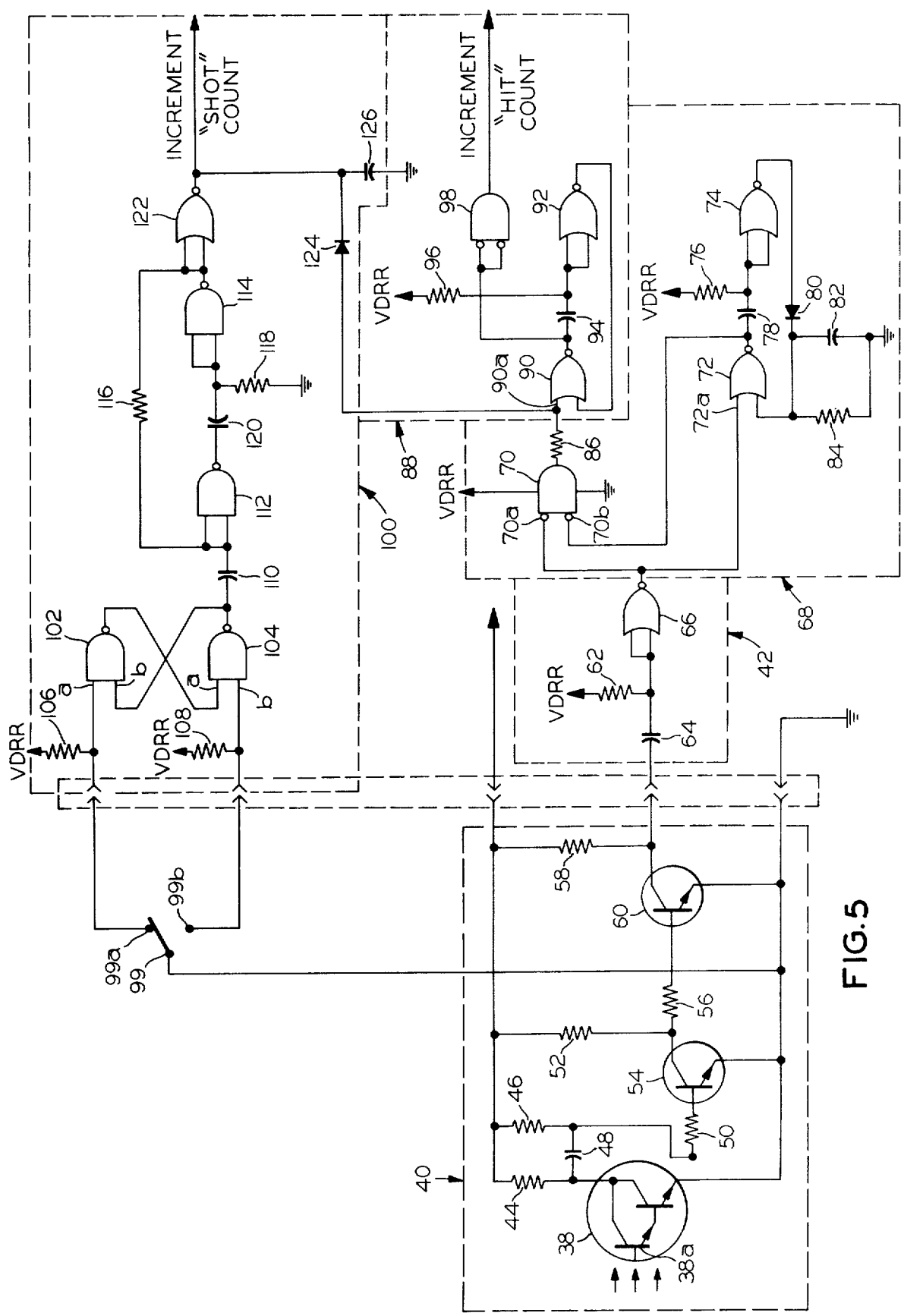

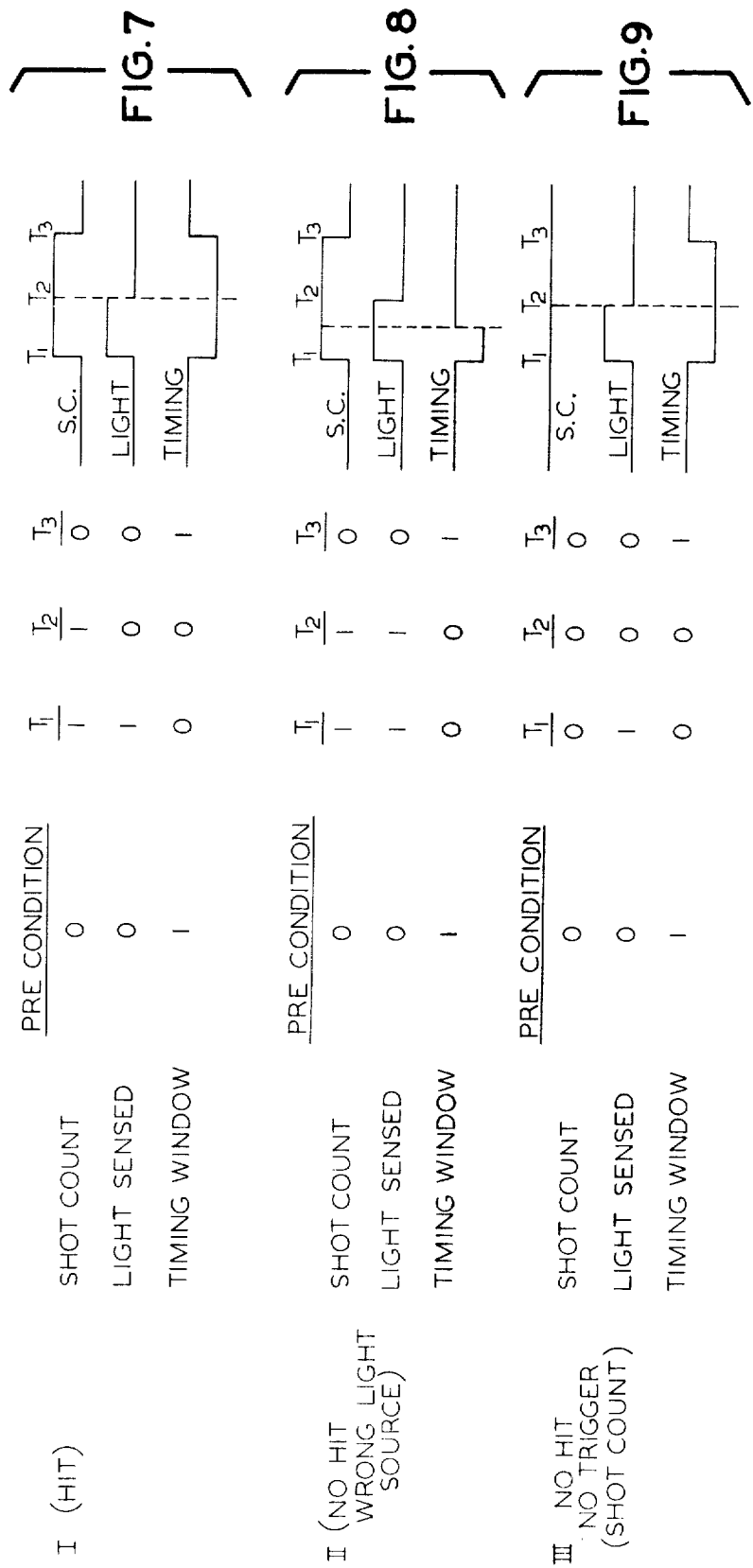

TELEVISION TARGET GAME AND METHOD

BACKGROUND OF THE INVENTION

Over the past several years, there has been extensive interest in electronic games played upon the video screen of standard home television receivers. These video games have generally tended to simulate sports action such as tennis, hockey, football, handball and the like. A number of patents have been issued relating to the electronic apparatus required or utilized for playing such video games including U.S. Pat. No. 3,829,095, granted Aug. 13, 1974 to Baer; No. 3,778,058, granted Dec. 13, 1973 to Rusch; No. Re 28,598, reissued Oct. 28, 1975 to Baer et al; No. Re 28,507, reissued Aug. 5, 1975 to Rusch; No. 3,728,480, granted Apr. 17, 1973 to Baer; and No. 3,809,395, granted May 7, 1974 to Allison et al.

A target game played on a video screen is disclosed in U.S. Pat. No. 3,046,676, granted July 31, 1962 to Hermann et al. A photosensitive light gun adapted for use in conjunction with a cathode ray screen is disclosed in Glaser et al U.S. Pat. No. 3,151,248, granted Sept. 29, 1964.

Moreover, there have existed previously various target games utilizing projected light beams to actuate photoelectric cells for registering hits, the light beam generally being transmitted from the barrel of a simulated firearm.

It will be appreciated that the light sensing means must be capable of discriminating between the target image or beam and ambient light such as for example sunlight, fluorescent light, incandescent light, etc. If such discrimination is not provided, then spurious hits will inevitably be recorded.

It is an object of the present invention to provide a novel target game which may be utilized in conjunction with the video screen of a television receiver so as to sense when a simulated firearm is aligned with a target image on the video screen.

It is also an object to provide such a target game which will discrimate between the video target image and spurious or ambient light sources.

Another object is to provide such a game apparatus which may be constructed so as to provide several circuit subassemblies for producing light discrimination and comparing the sensed light image with a known standard corresponding to a video screen image.

A further object is to provide such a game apparatus which will indicate a hit and will also indicate the number of "shots".

Still another object is to provide a method for playing a target game utilizing a simulated firearm and a video screeen generating a target image, which method permits discrimination between the target image and spurious or ambient light sources.

SUMMARY OF THE INVENTION

It has now been found that the foregoing and related objects may be readily attained in a target game to be utilized in conjunction with a video screen or cathode ray tube. The game comprises a simulated firearm including light sensing means, sighting elements aligned with the light sensing means and a trigger mechanism. The light sensing means generates a signal when the sighting elements are aligned with a light image, and this signal is coextensive in duration with the duration of the sensed light image.

The signal is transmitted to the control assembly which includes hit evaluating means comprising a time comparing circuit for comparing the duration of the sensed light image signal with a predetermined interval. If the sensed light image signal is of a duration within the predetermined interval, the hit evaluating means generates a hit signal.

In accordance with the preferred embodiment, the light sensing means of the simulated firearm includes optical means for focusing the light rays of a light image and a light sensitive transistor at substantially the point of focus of the optical means. The transistor generates an electrical output signal and the light sensing means additionally includes means for amplifying the electrical output signal from the transistor. Additionally, the light sensing means desirably includes circuit means for filtering the output signal of the transistor to eliminate signals corresponding to light images from sources other than a video screen.

The trigger of the firearm is electrically coupled to the hit evaluating means to effect actuation of components of the hit evaluating means; in the absence of such trigger actuation, such components prevent registry of a hit. Most desirably, the control assembly includes circuit means for further filtering the output signal of the transistor to eliminate signals from light sources other than a video screen.

In accordance with the preferred aspect of the invention, the time comparing circuit includes trigger responsive circuit means responsive to actuation of the trigger to provide a pulse output of predetermined interval, time interval circuit means providing a pulse output of the first mentioned predetermined interval and hit registering cirucit means responsive to coincidence of the pulses from the trigger responsive circuit means and the time interval circuit means.

The game itself involves a method utilizing the video screen and including the steps of providing a simulated firearm having light sensing means responsive to a light image aligned therewith. The player locates a target image on the video screen and aligns the firearm with the target image to cause the light sensing means to generate a signal corresponding to the duration of the target image. The duration of the signal from the light sensing means is compared with a predetermined interval corresponding to the duration of an image upon the video screen and, based upon substantial coincidence of the duration of the signal from the light sensing means and the predetermined interval, a hit is registered.

Desirably, the simulated firearm includes a trigger, and the trigger is pulled to fire the firearm and register a shot on the video screen. Desirably, the method includes the registration of the hit upon the video screen.

BRIEF DESCRIPTION OF THE DRAWINGS

FIG. 5 is a diagram of the circuitry of the assembly of FIG. 1;

FIG. 6 is a functional diagram of the operation of the circuitindicating the timing conditions;

FIG. 7 is a schematic presentation of the effect of the several elements of the circuitry in determining that a hit has occurred;

FIG. 8 is a similar schematic presentation showing the several elements resulting in determination of "no hit" as a result of a light source other than the target on the video screen; and FIG. 9 is a similar schematic presentation showing a determination of "no hit" when the trigger was not actuated at the time of alignment with the target on the video screen.

DETAILED DESCRIPTION OF THE ILLUSTRATED EMBODIMENTS

Figure 1:
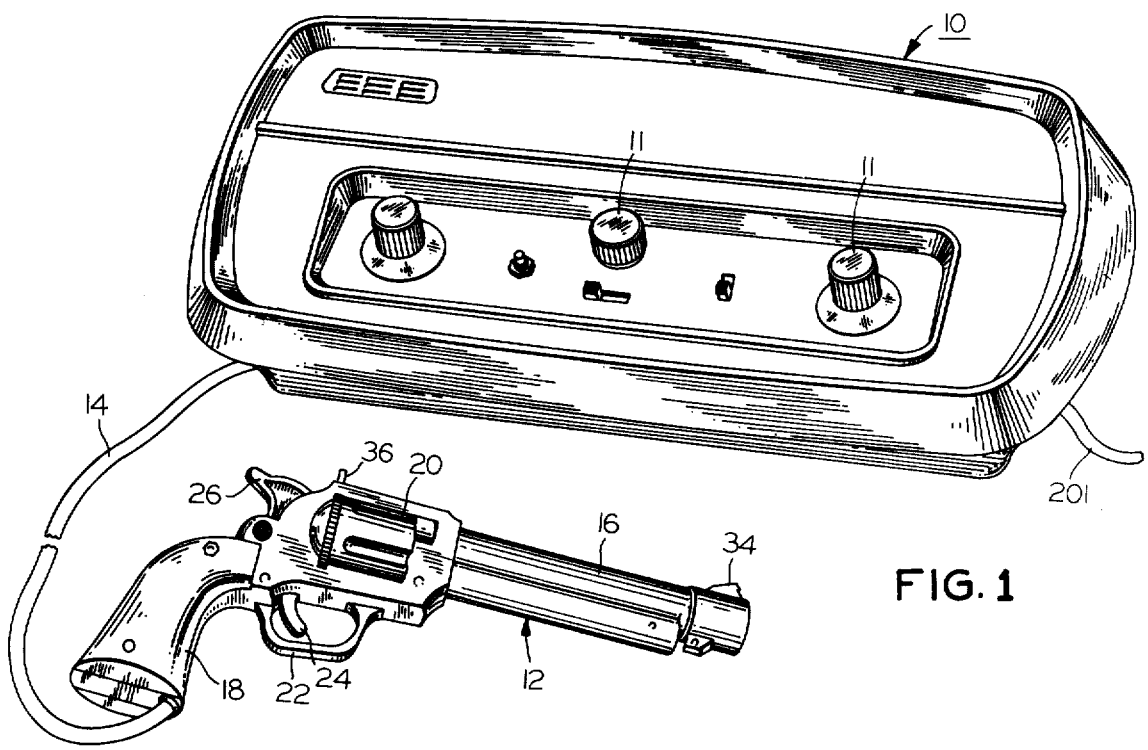
FIG. 1 is a perspective view of a game assembly embodying the present invention.
Figure 2:
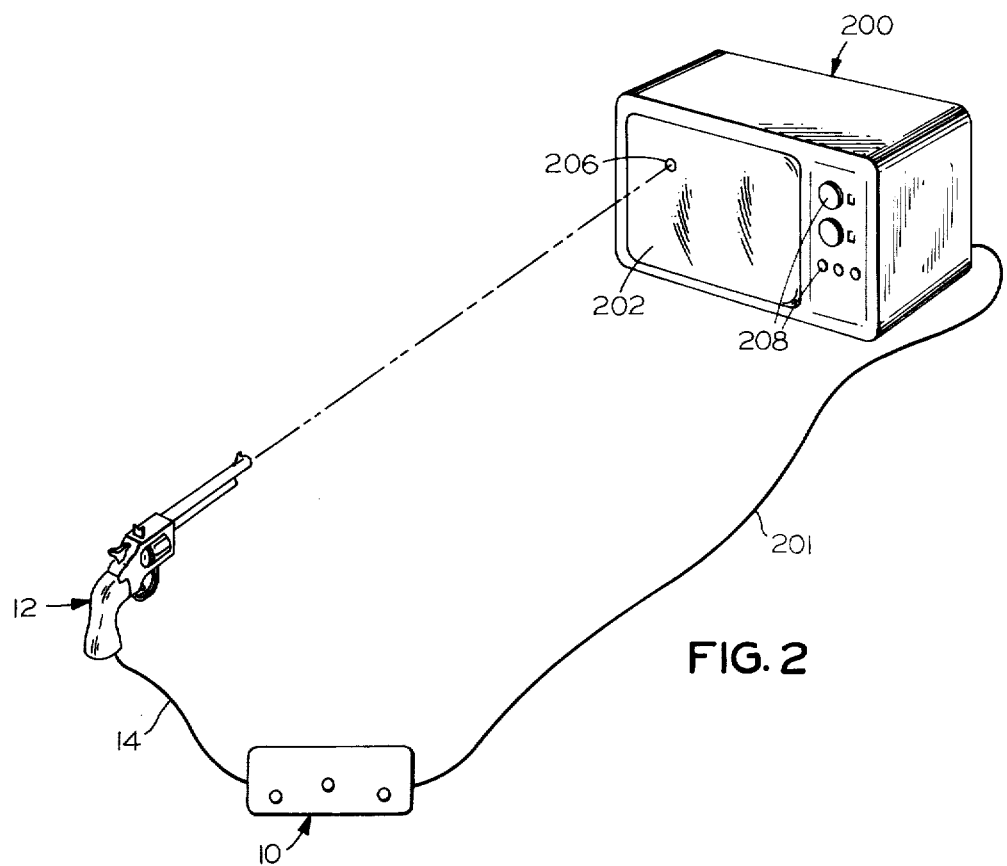
FIG. 2 is a partially diagrammatic view of the game assembly of FIG. 1 as used in combination with a conventional television receiver and with a target dot illustrated upon the video screen and the path of light rays from the target dot shown in phantom line.

Turning now in detail to the attached drawings, a game assembly embodying the present invention is comprised of the control assembly generally designated by the numeral 10 and the simulated pistol generally designated by the numeral 12 which are interconnected by the electrical cable or conductor 14. As seen in FIG. 2, the control assembly 10 in turn is connected to the television set or receiver generally designated by the numeral 200 by means of the cable 201. In accordance with conventional practice, the control assembly 10 has control knobs 11 and internal circuitry (not shown) which produces a signal acting upon the internal circuitry (not shown) of the television set 20 to produce a target image 206 upon the video screen 202. The external controls of the television set are designated by the numeral 208.

Details of such control apparatus for producing and manipulating visual images upon the video screen of the television set may be found in the several United States Letters Patents indentified hereinbefore as directed to video game apparatus. Since such apparatus and circuitry are old in the art and do not comprise a part of the present invention, it will not be further described hereinafter. Suffice that it produces a target image on the video screen, and this image may be fixed in position or movable, and it may be "continuously" visible or intermittent. As will be appreciated, however, a television image in fact comprises a light image appearing continuous to the naked eye, but the phosphors are actually flickering at intervals of about 1-2 milliseconds.

Turning first in detail to the pistol 12, it can be seen that it follows the tranditional configuration of a barrel 16, a grip 18, a receiver portion 20 and a trigger portion 22. Simulating the action of conventional revolvers, actuation of the trigger 24 causes pivotal movement of the hammer 26.

Figure 3:
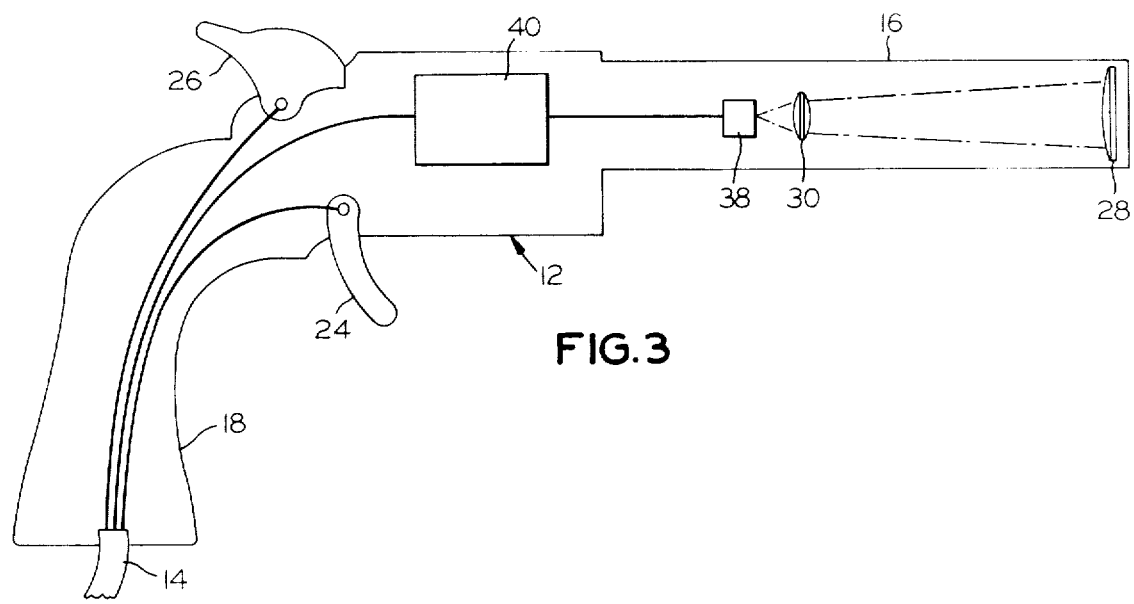
FIG. 3 is a partially diagrammatic vieew to an enlarged scale of the pistol of FIG. 1 with portions broken away to reveal internal conponents.

As shown in FIG. 3, disposed within the barrel is an optical lens system comprised of the outer lens 28 and the inner lens 30 which are aligned with the sighting elements 34, 36 on the exterior of the pistol 12 so that light rays emanating from a point at which the pistol is aimed will be focused and thereby intensified at a focal point within the barrel 16. At the focal point is the highly light-sensitive base 38a of the transistor 38, commonly known as a photo Darlington. Also disposed within the receiver portion 20 is pulse discrimination circuitry generally designated by the numeral 40 and which will be described more fully hereinafter.

Figure 4:
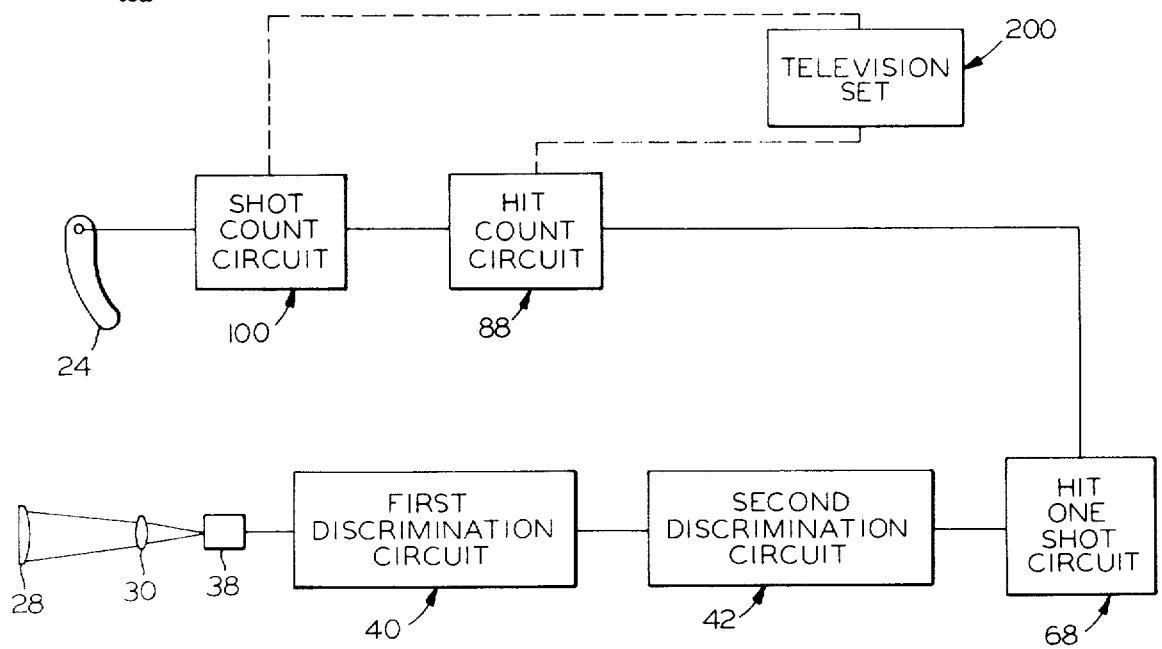
FIG. 4 is a block diagram of the functional circuit subassemblies of the game assembly.

The innovative circuitry of the game of the present invention is generally illustrated by the block diagram of FIG. 4 of the attached drawings. As seen, the pulse emanating from the discrimination circuit 40 is transmitted through the cable 14 to the control assembly 10 and passes through a second integrator and pulse shaping circuit generally designated by the numeral 41 into the "hit one shot" circuit generally designated by the numeral 68. Actuation of the trigger 24 actuates the increment or "shot count" circuit generally designated by the numeral 100 and the outputs of the "shot count" circuit 100 and "hit one shot" circuit 68 cooperate to actuate the "hit count" circuit generally designated by the numer 88. The "hit count" circuit 88 and "shot count" circuit 100 also transmit signals to the television set 200 for displaying numerical values corresponding to their serial outputs in any given game sequence.

Turning now in detail to the pulse discrimination circuit 40 which is within the pistol 12, this is shown in detail in FIG. 5 of the attached drawings. Power is continuously supplied to the transistor 38 through the resistor 44. When light rays strike the target base 38a of the transistor 38, the output signal is passed through an integrator circuit or signal shaping circuit comprised of the resistor 46 and capacitor 48 which have values selected so as to discriminate against light images significantly varying in peak duration from the light signal of a cathode ray screen. Only those pulses produced by light rays or images of a peak duration corresponding or similar to those on a cathode ray screen will permit development of potential in the capacitor 48 sufficient to generate a signal transmitted to the first stage amplification comprising the resistors 50, 52 and transistor 64. The partially amplified pulse then passes into a second amplification circuit comprising the resistors 56, 58 and transistor 60. The now fully amplified pulse is transmitted to the control unit 10 through the cable 14.

Turning now to the circuitry within the control assembly 10, the output signal from the discriminating circuit 40 of the pistol 12 is received within the control assembly and is discriminated and inverted in the second pulse discrimination circuit 42. This discrimination and inversion from a negative pulse to a positive pulse is accomplished by the combination of resistor 62 which is receiving a regulated voltage, capacitor 64 and inverter gate 66. As a result, the output of the inverter gate 66 is a clean, positive pulse.

The now positive pulse passes into the "hit one shot" circuit generally designated by the numeral 68. The pulse acts both upon the gate 70a of the "nor" gate 70 and upon the gate 72a of the nor gate 72. As can be seen, a monostable vibrator circuit is provided by the combination of the nor gate 74, resistor 76, capacitor 78 and the combination of the diode 80, capacitor 82 and resistor 84. As a result of these circuit components, a pulse acting upon the gate 72a of the nor gate 72 will generate a pulse of predetermined length which is transmitted to the gate 70b of the nor gate 70. If the pulse at the gate 70a is of shorter duration than the pulse at the gate 70b, an output signal will emanate from the gate 70. The resistor 86 tends to minimize the effect of minor variations in voltage outputs and avoid spurious signals.

The signal which has been generated now passes to the "hit count" circuit which is generally designated by the numeral 88. As seen, the signal enters the gate 90a of the nor gate 90 and stimulates the basic one shot multivibrator circuit provided by the combination of nor gates 90 and 92, capacitor 94 and resistor 96, thus generating a monostable output signal which is passed to the inverter gate 98 which in turn produces a limited duration positive output pulse which is transmitted to other functional control circuitry for the signal appearing upon the video screen itself as will be described in more detail hereinafter.

In order to count the "shots" and actuate the hit count circuit 88, the trigger 24 is connected to the switch 99 of the "shot count" circuit generally designated by the numeral 100. In its normal unactuated state with the hammer 26 released, the pole 99a is closed. When the trigger is pulled, it moves the hammer 26 to close the pole 99b and, during further movement, the hammer 26 is released to its discharged position again closing the pole 99a. In simulating one type of user action of such a revolver, manual setting or cocking of the hammer 26 will close the pole 99b and actuation by the trigger will again close the pole 99a.

As can be seen, the nand gates 102, 104 cooperate with the resistors 106, 108 to provide a "flip flop" circuit. With the trigger 24 closing the pole 99a, a low signal enters the gate a of the nand gate 102 and a high signal exits therefrom into the gate a of the nand gate 104. Simultaneously, in the same position of the switch, a high signal enters the gate b of nand gate 104 and a low signal exits the nand gate 104 and enters the gate b of the nand gate 102.

When the switch 99 is moved to close the pole 99b, the states are reversed. Thus, as the trigger 24 causes the switch 99 to close the pole 99a, the states of the flip flop circuit are reversed and generate a negative pulse sensed at the capacitor 110. This pulse now enters the monostable multivibrator circuit comprised of the nor gates 112, 114, resistors 116, 118 and capacitor 120.

As a result, a negative pulse of predetermined length is delivered to the nor gate 122 which effects inversion into a positive output pulse. As shown, this output pulse is transmitted to a shot counting mechanism (not shown) which will be described more fully hereinafter. In addition, this pulse causes the diode 124 to become nonconducting, thus preventing a path to ground from the output of the gate 70 and permitting the development of a positive pulse acting upon the gate 90a of the nor gate 90 in the hit count circuit 88. The capacitor 126 serves to eliminate spurious spikes and noise in the circuit.

As will be readily appreciated, any light rays may enter the optical lens system of the light sensing means in the pistol 12 and be focused onto the transistor 38 so that it generates an electrical output. Thus, the goal is to provide means for descriminating a video target from other ambient light sources.

First, the pulse shaping network comprised of the resistor 46, capacitor 48, resistor 50 and transistor 54 invert the negative output from the transistor 38 into a positive pulse of the desired narrow width for comparison in the "hit one shot" circuit 68. However, the values of the components are selected so that only a high or rapid rise light source will allow the capacitor 48 to charge sufficiently rapidly to produce the output pulse of desired width. Sunlight will act as a continuous "DC" source and actuate the capacitor. Incandescent and fluorescent light have much slower rise times to reach full amplitude. Thus, its discrimination circuit provides a first basis for differentiation in producing a significantly different pulse width.

Since the pulse or signal from the transistor 38 is weak, it is amplified by both the transistors 54 and 60.

The pulse is further shaped and sharpened in the second discriminationcircuit 42 which turns it again into a positive pulse.

At this point the pulse enters the "hit one shot" circuit 68. This circuit produces a feed back delay acting on the nor gate 70 concurrently with the pulse. This in turn determines the width of the output pulse from the nor gate 70. The output pulse width of the circuit 68 by the RC time constants of R84 and C82 and of R76 and C78 in accordance with the formula $T=RC$.

As previously described, the trigger 24 actuates the switch 99 and the "flip flop" circuit to produce a pulse in the increment shot count circuit 100. The output pulse from the nor gate 122 is of a longer width than the pulse of the nor gate 70 resulting from a video target image, and it is positive so as to act upon the diode 124 and close a path to ground from the nor gate 70.

Thus, if the pulse from the "hit one shot" circuit 68 is of greater width than the width of the pulse from the inverter gate 66 and coincides with the pulse from the shot count circuit 100, a pulse enters the hit count circuit 88 to register a nit.

In FIG. 6, there are schematically shown the several key pulse widths and their spatial relationships. As seen the shot count pulse from the circuit 100 is relatively wide and labelled with three time points T1, T2 and T3. The pulse output from the light sensing means as shaped at the inverter gate 66 is shown with a video signal pulse in full line and a pulse from an incandescent light source represented by the dotted line extension. The pulse from the "hit one shot" circuit 68 or timing window is the third representation.

In FIG. 7, the pulse conditions at several time points are numerically and also graphically presented. As seen the shot count pulse rises at T1 and drops at T3 for a width of T1–T3. The light sensed rises at T1 and drops at T2 for a width of T1–T2. The timing window pulse drops at T1 and rises at T3 for a width of T1–T3. Thus the light sensed pulse is within the timing window pulse and occurs when the trigger is actuated so that a hit is registered.

In FIG. 8, the shot count pulse width is again T1–T3, but the light sensed pulse is longer than T1–T2 indicating an incandescent or other relatively long light period. As a result, the light pulse is not shorter than the timing window and no hit occurs.

In FIG. 9, the trigger is not pulled so that the shot count pulse is not generated. Accordingly, no hit count can occur.

As will be readily appreciated, the various gates are most conveniently provided within an integrated circuit chip provided with suitable contacts for electrical connection thereto. However, various combinations of vacuum tubes and/or transistors or other components may be used for the same functional purpose as is well known in the art.

In playing the game, conveniently the control apparatus 10 generates a signal transmited to the television receiver 200 to produce the target image 206 on the screen. This image may be manipulated by another player using the controls 11 or by internal circuitry (not shown).

The player then attempts to align the pistol 12 with the target image 206 by centering the image 206 in the sighting elements 34, 36. He then squeezes the trigger 24 registering a shot through the shot count circuit 100, which desirably transmits its output signal to the television set 200 to display the number of shots fired.

Assuming that the player has properly aligned the pistol 12 with the image 206, the circuits will evaluate the light image as being a television image and determine a hit. The hit count circuit 88 then transmits its output signal to the television set 200 to display the number of hits. This signal may also briefly or totally blank the light image 206 to simulate a hit.

The optical lens system desirably has a fairly wide range of focus, 3 to 10 feet having proven advantageous. As will be appreciated, movement relative to the set varies the level of illumination sensed since that level varies inversely proportional to the distance. As a result, the light sensing means remains operational over the range of focus.

Although the control means has been shown as within a separate unit connected to the firearm by a conductor, it will be readily appreciated that the control means may be included with the firearm, particularly when it comprises a simulated weapon providing larger volume such as a shotgun or carbine with a large stock.

Moreover, the game need not generate a special target image. Any image on the video screen of sufficient luminous intensity to permit activation of the detector circuitry will suffice.

Thus, it can be seen from the foregoing detailed description and drawings that the game of the present invention offers unique action in sensing light images and in discriminating between light images generated upon the video screen and ambient light or other light sources. Moreover, the game apparatus permits facile recordation of hits and shots and enables the developmentof a high degree of skill in the alignment of the simulated firearm with a target image upon the video screen.

Having thus described the invention, I claim:

1. In a target game utilizing the screen of a cathode ray tube to present a light image, the combination comprising:
  A. a simulated firearm including:
    (1) light sensing means,
    (2) sighting elements aligned with said light sensing means; and
    (3) a trigger mechanism,
    said light sensing means generating a signal when said sighting elements are aligned with a light image; and
  B. a control assembly including:
    (1) hit evaluating means including means for receiving the sensed light image signal from said light sensing means, for establishing predetermined maximum duration, for establishing a time interval that begins upon reception by said hit evaluating means of said light image signal and ends after reception of said light image signal by an amount of time equal to said predetermined maximum duration, for testing whether said light image signal ends before said time interval, and for generating a hit signal if the light image signal ends before the maximum-duration time interval.

2. The target game in accordance with claim 1 wherein said light sensing means of said simulated fire arm includes optical means for focusing the light rays of a light image.

3. The target game in accordance with claim 2 wherein said light sensing means includes a light sensitive transistor at substantially the point of focus of said optical means, said transistor generating a sensor output signal.

4. The target game in accordance with claim 3 wherein said light sensing means includes circuit means for filtering said sensor signal to eliminate signals corresponding to light images from sources other than a video screen.

5. The target game in accordance with claim 4 wherein said means for establishing a predetermined maximum duration and a time interval include a capacitor and resistor in series with values selected to elilminate transistor pulses from light sources having an image duration at least three times the length of the image on a video screen.

6. The target game in accordance with claim 3 wherein said light sensing means includes amplifying means for amplifying said sensor signal.

7. The target game in accordance with claim 1 wherein said trigger is electrically coupled to said hit evaluating means to effect actuation of components of said hit evaluating means.

8. The target game in accordance with claim 1 wherein there is included conductor means interconnecting said simulated firearm and control assembly.

9. The target game in accordance with claim 1 wherein said means for receiving said light image signal, for establishing said maximum duration and said time interval, for testing whether said light image signal ends before said time interval, and for generating a hit signal includes trigger responsive circuit means responsive to actuation of said trigger to provide a pulse output of a predetermined interval, time interval circuit means providing a pulse output whenever the duration of said light image signal is less than said predetermined maximum duration, and hit registering circuit means responsive to coincidence of the pulses from said trigger responsive circuit means and said time interval circuit means.

10. The target game in accordance with claim 9 wherein said time interval circuit means is responsive to the output of said light sensing means and said hit registering circuit means is isolated until coincidence of output pulses from said time interval circuit means and said trigger responsive circuit means.

11. The target game of claim 1 wherein said means for receiving said light image signal, for establishing a predetermined maximum duration and a time interval, for testing whether said light image signal ends before said time interval, and for generating a hit signal include means for generating a duration signal that begins upon reception by said hit evaluating means of said light image signal and ends after reception of said light image signal by an amount of time equal to said predetermined maximum duration, and comparison means for receiving said sensed light image signal and said duration signal and generating said hit signal only if said light image signal ends before said duration signal.

12. The target game in accordance with claim 11 wherein said comparison means includes trigger responsive circuit means responsive to actuation of said trigger to provide a pulse output of a predetermined interval, time interval circuit means providing a pulse output whenever the duration of said light image signal is less than said predetermined maximum duration, and hit registering circuit means responsive to coincidence of the pulses from said trigger responsive circuit means and said time interval circuit means.

13. The target game of claim 11 wherein said light sensing means of said simulated fire arm includes optical means for focusing the light rays of a light image.

14. The target game of claim 13 wherein said light sensing means includes a light sensitive transistor at substantially the point of focus of said optical means, said transistor generating a sensor output signal.

15. The target game of claim 14 wherein said light sensing means includes circuit means for filtering said sensor signal to eliminate signals corresponding to light images from sources other than a video screen.

16. The target game of claim 15 wherein said means for establishing a predetermined maximum duration and a time interval include a capacitor and resistor in series with values selected to eliminate transistor pulses from light sources having an image duration at least three times the length of the image on a video screen.

17. The target game of claim 14 wherein said light sensing means includes amplifying means for amplifying said sensor signal.

18. The target game of claim 11 wherein said trigger is electrically coupled to said hit evaluating means to effect actuation of components of said hit evaluating means.

19. The target game of claim 11 wherein there is included conductor means interconnecting said simulated firearm and control assembly.

20. The target game of claim 11 wherein said light sensing means include a light sensor for producing a sensor signal indicative of the intensity of light reaching said light sensor and filter means connected to receive said sensor signal and arranged to produce a light image signal in response to a sensor signal only if the rate of change of the sensor signal at its leading edge is greater than a predetermined minimum rate.

21. The target game of claim 1 wherein said light sensing means includes a light sensor for producing a sensor signal indicative of the intensity of light reaching said light sensor and filter means connected to receive said sensor signal and arranged to produce a light image signal in response to a sensor signal only if the rate of change of the sensor signal at its leading edge is greater than a predetermined minimum rate.

22. A method for playing a target game using a video screen comprising:
   A. providing a simulated firearm having light sensing means responsive to a light image aligned therewith;
   B. generating a target image on a video screen;
   C. aligning said firearm with said target image, said light sensing means generating a signal corresponding to the duration of said target image;
   D. establishing a predetermined maximum duration;
   E. establishing a time interval that begins upon reception by said hit evaluating means of said light image and ends after reception of said light image signal by an amount of time equal to said predetermined maximum duration;
   F. testing whether said light image signal ends before said time interval; and
   G. registering a hit if the light image signal ends before the maximum-duration time interval.

23. The target game method of claim 22 wherein said simulated firearm includes a trigger and additionally including the steps of pulling said trigger to fire said firearm and registering a shot on said video screen.

24. The target game method of claim 23 wherein there is included the step of registering said hit upon the video screen.

25. The target game method of claim 22 including the additional steps of aiming said simulated firearm at a light source other than said video screen target image; sensing the light rays emanating from said other light source and generating a signal corresponding in duration to said other light source; and evaluating said signal from said other light source to determine an interval different from that of said video screen target image and therefore a "miss".

26. The target game method of claim 25 wherein said simulated firearm includes a trigger and additionally including the steps of pulling said trigger to fire said firearm and registering a shot on said video screen.

* * * * *